(12) United States Patent
Mo et al.

(10) Patent No.: US 10,516,727 B2
(45) Date of Patent: Dec. 24, 2019

(54) ADAPTIVE COMMUNICATION METHOD AMONG COMPONENTS BASED ON LINUX

(71) Applicant: G-CLOUD TECHNOLOGY Co. Ltd, Dongguan, Guangdong (CN)

(72) Inventors: Zhanpeng Mo, Guangdong (CN); Song Yang, Guangdong (CN); Tongkai Ji, Guangdong (CN)

(73) Assignee: G-CLOUD TECHNOLOGY Co. Ltd, Dongguan, Guangdong (CN)

( * ) Notice: Subject to any disclaimer, the term of this patent is extended or adjusted under 35 U.S.C. 154(b) by 1221 days.

(21) Appl. No.: 14/654,531

(22) PCT Filed: Dec. 19, 2014

(86) PCT No.: PCT/CN2014/094327
§ 371 (c)(1),
(2) Date: Jun. 21, 2015

(87) PCT Pub. No.: WO2015/090225
PCT Pub. Date: Jun. 25, 2015

(65) Prior Publication Data
US 2016/0261681 A1     Sep. 8, 2016

(30) Foreign Application Priority Data

Dec. 20, 2013 (CN) .......................... 2013 1 0714380

(51) Int. Cl.
*H04L 29/08* (2006.01)
*G06F 9/54* (2006.01)
*H04L 12/24* (2006.01)

(52) U.S. Cl.
CPC .............. *H04L 67/10* (2013.01); *G06F 9/546* (2013.01); *H04L 29/08* (2013.01); *H04L 41/32* (2013.01)

(58) Field of Classification Search
None
See application file for complete search history.

(56) References Cited

U.S. PATENT DOCUMENTS

| 6,115,744 | A * | 9/2000 | Robins .................... H04L 29/06 709/203 |
| 8,259,582 | B2 * | 9/2012 | Friedman ............ H04L 49/9073 370/235 |
| 8,335,853 | B2 * | 12/2012 | Bharrat ............... G06F 11/1482 709/227 |
| 8,930,545 | B2 * | 1/2015 | Takeda ............. H04L 29/12528 370/420 |

(Continued)

*Primary Examiner* — Thomas J Dailey

(57) ABSTRACT

An adaptive communication method among components based on Linux, related to a technical field of network communication in a distributed environment, includes steps of: creating a unidirection persistent connection between each two communication hosts with a service program; generating a component address list after a distributed component is launched; during communication, packaging a message into a JSON format, searching the address list to find an address, and sending the message to a target component via a Linux local socket or the created unidirection persistent connection according to a location relationship; and, when the component stops, deleting information about the component from the component address list.

16 Claims, 2 Drawing Sheets

(56) References Cited

U.S. PATENT DOCUMENTS

2013/0151655 A1\* 6/2013 Wu ..................... H04L 67/2823
  709/217
2015/0081767 A1\* 3/2015 Evens ..................... H04L 67/30
  709/203

\* cited by examiner

ADAPTIVE COMMUNICATION METHOD AMONG COMPONENTS BASED ON LINUX

CROSS REFERENCE OF RELATED APPLICATION

This is a U.S. National Stage under 35 U.S.C. 371 of the International Application PCT/CN2014/094327, filed Dec. 19, 2014, which claims priority under 35 U.S.C. 119(a-d) to CN 201310714380.0, filed Dec. 20, 2013.

BACKGROUND OF THE PRESENT INVENTION

Field of Invention

The present invention relates to a technical field of network communication in a distributed environment, and more particularly to an adaptive communication method among components based on Linux.

Description of Related Arts

In the distributed environment, particularly in the cloud computing environment, due to the large number of the network components which need to communicate with each other and the great amount of communication data, it seems quite important to reduce the network cost and enhance the real time communication. Because of the convenience in usage of the Web Service protocol and the firewall transversal of the http protocol, the distributed communication usually employs the mode of Web Service on http for the communication among the components. However, in the situation of the frequent communication and the great amount of communication data, the mode usually causes the following problems.

Firstly, the mode results in the big redundancy of messages. The Web Service employs the message format of XML. During the communication, the payload of the messages is relatively small. In other words, the Web Service requires a relatively large amount of messages for bearing information to transmit the same amount of information, which impairs the real time performance of the communication under the constant bandwidth.

Secondly, the mode has the high system cost. The http "request-response" mode creates and closes the connection every time, which brings the high costs to the operating system. When the components frequently communicate with each other, the performance of the operating system is severely impaired, so as to further weaken the performance of the whole distributed application and reduce the real time performance of the communication.

Thirdly, the using manner of the mode lacks flexibility. The http protocol rules that only the client is able to initiate the connection to the server to communicate, not the other way around. Therefore, the two parties involved in the communication are required to both have the programs of the server and the client so that the two parties are both able to initiate the communication.

SUMMARY OF THE PRESENT INVENTION

An object of the present invention is to provide an adaptive communication method among components based on Linux, for overcoming a low efficiency, a high cost and a poor real time performance in communication within a distributed environment, where components communicate frequently and where a great amount of communication data exist.

Accordingly, in order to accomplish the above objects, the present invention provides an adaptive communication method among components based on Linux, comprising steps of:

(1) developing a service program on each of a plurality of hosts, wherein distributed components on each of the plurality of hosts communicate by calling the service program;

(2) creating, by at least two hosts from the plurality of hosts which need to communicate, a unidirection persistent connection between each of the at least two hosts with the service program;

(3) after a first distributed component on a first host from the plurality of hosts is launched, sending a launching message into the service program of the first host; sending the launching message to the service program of a second host from the plurality of hosts through each the unidirection persistent connection, by the service program of the first host, and receiving the launching message which is sent from the service program of the second host, by the service program of the first host, so as to form a component address list;

(4) when the first distributed component needs to send a message to a target component, packaging the message into a JSON (JavaScript Object Notation) format by the service program of the first host and providing the service program of the first host with a name of the target component;

(5) according the name of the target component, searching the component address list by the service program of the first host to find an address of the target component; if the target component is on the first host, directly sending the message to the target component through a Linux local socket; if the target component is on the second host, sending the message to the second host through the unidirection persistent connection which is created between the first host and the second host, and then sending the message to the target component by the service program of the second host; and (6) when the first distributed component on the first host stops, sending a stopping message to the service program of the first host; sending the stopping message to the service program of the second host through each the unidirection persistent connection, and deleting information about the first distributed component from the component address list, by the service program of the first host; deleting the information about the first distributed component from the component address list by the service program of the second host.

Each distributed component is a process which runs independently. The distributed component obtains input and sends output by exchanging the message with the other distributed component.

The service program is a Linux auto-start service process.

The distributed components and the service program on the same host communicate in a manner of Linux pipe.

The component address list comprises the name of each the component and an address of the host where the component is located.

The "adaptive" refers to an adaptive ability of the service program which is able to automatically select the local socket or the unidirection persistent connection, according to the address of the target component, for sending the message.

The JSON format of the message is:

```
#ctrl: {,==============================> header
    src:gtclient_desktop,-------- >>source
```

```
    dst:gtclient_laptop,--------- >>destination
    dataDesc:test,--------------- >>data description
}
#data: {,=============================> payload
    key:whatthehell,------------- >>data
}.
```

The method, provided by the present invention, is for the adaptive communication among the components based on Linux. The method of the present invention has a low communication frequency and a small amount of communication data, so as to effectively improve the communication efficiency, reduce the cost and improve the real time performance.

BRIEF DESCRIPTION OF THE DRAWINGS

The present invention is further illustrated by the accompanying drawings.

DETAILED DESCRIPTION OF THE PREFERRED EMBODIMENT

Figure 1:
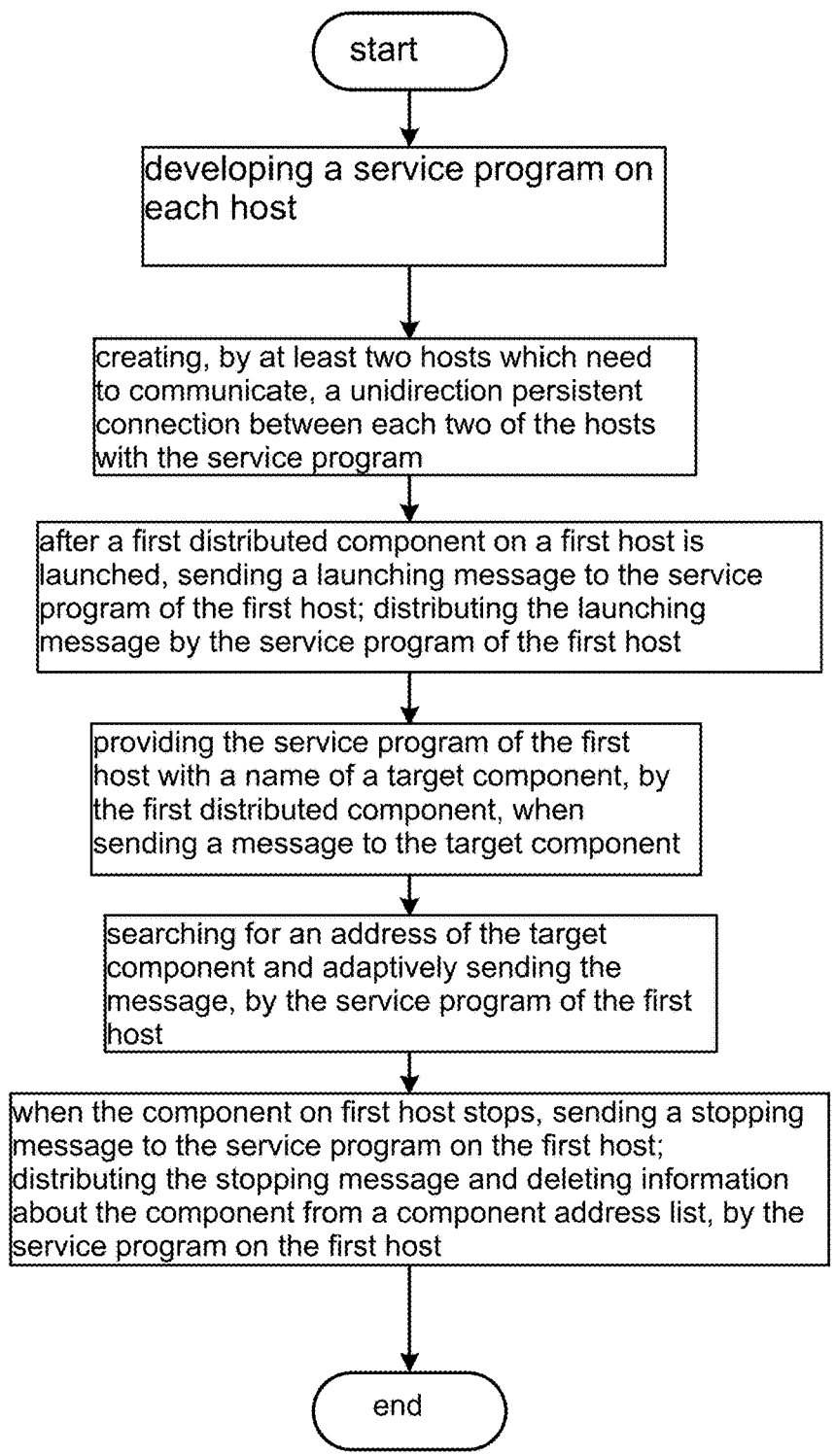
FIG. 1 is a flow chart of an adaptive communication method among components based on Linux according to a first preferred embodiment of the present invention.

Referring to FIG. 1 of the drawings, according to a first preferred embodiment of the present invention, an adaptive communication method among components based on Linux comprises steps of:

(1) developing a service program on each of a plurality of hosts, wherein distributed components on each of the plurality of hosts communicate by calling the service program;

(2) creating, by at least two hosts from the plurality of hosts which need to communicate, a unidirection persistent connection between each of the at least two hosts with the service program;

(3) after a first distributed component on a first host from the plurality of hosts is launched, sending a launching message into the service program of the first host; sending the launching message to the service program of a second host from the plurality of hosts through each the unidirection persistent connection, by the service program of the first host, and receiving the launching message which is sent from the service program of the second host, by the service program of the first host, so as to form a component address list;

(4) when the first distributed component needs to send a message to a target component, packaging the message into a JSON (JavaScript Object Notation) format by the service program of the first host and providing the service program of the first host with a name of the target component;

(5) according the name of the target component, searching the component address list by the service program of the first host to find an address of the target component; if the target component is on the first host, directly sending the message to the target component through a Linux local socket; if the target component is on the second host, sending the message to the second host through the unidirection persistent connection which is created between the first host and the second host, and then sending the message to the target component by the service program of the second host; and (6) when the first distributed component on the first host stops, sending a stopping message to the service program of the first host; sending the stopping message to the service program of the second host through each the unidirection persistent connection, and deleting information about the first distributed component from the component address list, by the service program of the first host; deleting the information about the first distributed component from the component address list by the service program of the second host;

wherein each distributed component is a process which runs independently; the distributed component obtains input and sends output by exchanging the message with the other distributed component; the service program is a Linux auto-start service process; the distributed components and the service program on the same host communicate in a manner of Linux pipe; and wherein the component address list comprises the name of each the component and an address of the host where the component is located; the "adaptive" refers to an adaptive ability of the service program which is able to automatically select the local socket or the unidirection persistent connection, according to the address of the target component, for sending the message.

The JSON format of the message is:

```
#ctrl: {,=============================> header
    src:gtclient_desktop,-------- >>source
    dst:gtclient_laptop,--------- >>destination
    dataDesc:test,--------------- >>data description
}
#data: {,=============================> payload
    key:whatthehell,------------- >>data
}.
```

Figure 2:
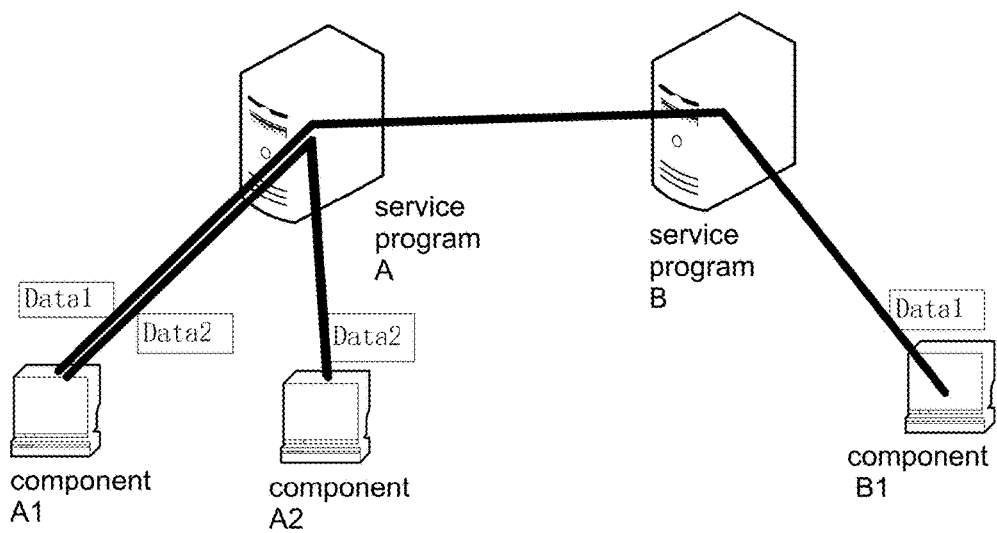
FIG. 2 is a sketch view of a structure of the adaptive communication method among components based on Linux according to a second preferred embodiment of the present invention.

Referring to FIG. 2, an implementation of the adaptive communication method among components based on Linux requires an implementation of receiving and sending messages between the service program and the distributed component. In the second preferred embodiment, the adaptive communication method among components based on Linux is implemented by C++ Programming Language.

Firstly, a service program is developed for running on two hosts which need to communicate. The hosts are responsible for receiving and sending messages, wherein four threads are respectively for receiving and sending local and remote messages.

```
class gtController
{
public:
    //control starting/ending of the threads
    bool thread_control(THREAD_T thread, bool enable=false);
    //thread for receiving the message from a local component
    void local_recv_thread(void);
    //transferring the message to the local component
    void local_listen_thread(void);
    //thread for receiving the message from the other host
    void remote_accept_thread(void);
    //thread for sending the message to the other host
    void remote_listen_thread(void);
    bool start(void);
```

Secondly, a unidirection persistent connection is created between the two hosts which need to communicate with the service program.

```
foreach(listenMap,itrt) {
    //creating a socket connection
    SOCKET inetListen = connector.inet_listen_create(itrt->first,
    itrt->second);
    if (inetListen > 0) {
        g_pdata->addListenSocket(itrt->first, itrt->second, inetListen);
    }
    else{
        logDebug("Inet listen socket create failed, gTunnel exit");
        return -1;
    }
}
```

Thirdly, after the component is launches, a launching message is sent to the service program.

```
int Register( )
{
    int ret;
    char buf[1024];
    int i;
    //static struct sockaddr_un srv_addr;
    memset(buf,0,1024);
        char            *packetRegist           =
packetRegistConstruct(g_szClientName,g_szClientName,0);
        CtrlSend(packetRegist,strlen(packetRegist),0,0);
        free(packetRegist);
        return 0;
}
```

Fourthly, the service program receives the message and then updates a component address list.

```
bool gtProcessor::ctrl_packet_process(string& ctrlpack,
SOCKET fd)
{
    list<string> key;
    key.push_back(SRC);
    key.push_back(PACKTYPE);
    key.push_back(DATADESC);
    key.push_back(UUID);
    map<string, string> packtype;
    handler->packet_get_values(ctrlpack, CTRL_ITEM, key,
    packtype);
    if (packtype[PACKTYPE] != PACKTYPE_CTRL) { // wrong
        return false;
    }
    //process after receiving the launching message, adding one
line to the component address list
        if (packtype[DATADESC] == DATADESC_CLIENTREG)
            return clientreg_process(packtype[SRC], packtype[UUID],
                fd);
        //process upon a stopping message, deleting the corresponding
line from the component address list
        else if (packtype[DATADESC] ==
        DATADESC_CLIENTUREG)
            return clientunreg_process(packtype[SRC]);
        else if (packtype[DATADESC] ==
        DATADESC_CLIENTLIST)
            return true;
        return false;
}
```

Fifthly, the service program obtains an address to which the message is to be sent, and decides to send the message via a network or locally.

```
//dstfd is the address to which the message is to be sent
foreach(dstfd, fd) {
    sendable.clear( );
    sendlist.clear( );
    sendlist.push_back(*fd);
    connector->write_check(sendlist, sendable, 100); // 100ms
```

```
is  mercy enough
    if (! sendable.empty( )) {
        lite = find(lfds.begin( ), lfds.end( ), *fd);
        if (lite == lfds.end( ))
            sendpacket = full_packet;
        else {
            sendpacket = packet;
        }
        //sending the message
        int32_t sendnum = send(*fd, sendpacket.c_str( ),
                    sendpacket.length( ), MSG_DONTWAIT);
        if (sendnum < 0) {
            logError(PROCESSOR"send packet to fd(%d) failed: %s",
                *fd, strerror(errno));
            retval = false;
            continue;
        }
        else if ((uint32_t)sendnum != sendpacket.length( )) {
            logError(PROCESSOR"send packet but send size %d not "
                "equal packet size %d",
                sendnum, sendpacket.length( ));
            retval = false;
            continue;
        }
        else {
            logDebug(PROCESSOR"send packet done");
        }
    }
    else {
        logWarn("what a amazing the fd [%d] is not writable !!
        ignore ...", *fd);
    }
}
```

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An adaptive communication method among components based on Linux, comprising steps of:
   (1) developing a service program on each of a plurality of hosts, wherein distributed components on each of the plurality of hosts communicate by calling the service program;
   (2) creating, by at least two hosts from the plurality of hosts which need to communicate, a unidirection persistent connection between each of the at least two hosts with the service program;
   (3) after a first distributed component on a first host from the plurality of hosts is launched, sending a launching message into the service program of the first host; sending the launching message to the service program of a second host from the plurality of hosts through each the unidirection persistent connection, by the service program of the first host, and receiving the launching message which is sent from the service program of the second host, by the service program of the first host, so as to form a component address list;
   (4) when the first distributed component needs to send a message to a target component, packaging the message into a JSON (JavaScript Object Notation) format by the service program of the first host and providing the service program of the first host with a name of the target component;

(5) according to the name of the target component, searching the component address list by the service program of the first host to find an address of the target component; if the target component is on the first host, directly sending the message to the target component through a Linux local socket; if the target component is on the second host, sending the message to the second host through the unidirection persistent connection which is created between the first host and the second host, and then sending the message to the target component by the service program of the second host; and (6) when the first distributed component on the first host stops, sending a stopping message to the service program of the first host; sending the stopping message to the service program of the second host through each the unidirection persistent connection, and deleting information about the first distributed component from the component address list, by the service program of the first host; deleting the information about the first distributed component from the component address list by the service program of the second host.

2. The adaptive communication method among components based on Linux, as recited in claim 1, wherein each of the distributed components is a process which runs independently; the distributed components respectively obtain input and send output by exchanging the messages with each other;

the service program is a Linux auto-start service process; and the distributed components and the service program on the same host communicate in a manner of Linux pipe.

3. The adaptive communication method among components based on Linux, as recited in claim 1, wherein the component address list comprises the name of each the component and an address of the host where the component s located.

4. The adaptive communication method among components based on Linux, as recited in claim 2, wherein the component address list comprises the name of each the component and an address of the host where the component is located.

5. The adaptive communication method among components based on Linux, as recited in claim 1, wherein the service program automatically selects a local socket or the unidirection persistent connection, according to the address of the target component, for sending the message.

6. The adaptive communication method among components based on Linux, as recited in claim 2, wherein the service program automatically selects a local socket or the unidirection persistent connection, according to the address of the target component, for sending the message.

7. The adaptive communication method among components based on Linux, as recited in claim 3, wherein the service program automatically selects a local socket or the unidirection persistent connection, according to the address of the target component, for sending the message.

8. The adaptive communication method among components based on Linux, as recited in claim 4, wherein the service program automatically selects a local socket or the unidirection persistent connection, according to the address of the target component, for sending the message.

9. The adaptive communication method among components based on Linux, as recited in claim 1, wherein the JSON format of the message is:

```
#ctrl: {,=============================> header
    src:gtclient_desktop,-------- >>source
    dst:gtclient_laptop,--------- >>destination
    dataDesc:test,-------------- >>data description
}
#data: {,=============================> payload
    key:whatthehell,------------- >>data
}.
```

10. The adaptive communication method among components based on Linux, as recited in claim 2, wherein the JSON format of the message is:

```
#ctrl: {,=============================> header
    src:gtclient_desktop,-------- >>source
    dst:gtclient_laptop,--------- >>destination
    dataDesc:test,-------------- >>data description
}
#data: {,=============================> payload
    key:whatthehell,------------- >>data
}.
```

11. The adaptive communication method among components based on Linux, as recited in claim 3, wherein the JSON format of the message is:

```
#ctrl: {,=============================> header
    src:gtclient_desktop,-------- >>source
    dst:gtclient_laptop,--------- >>destination
    dataDesc:test,-------------- >>data description
}
#data: {,=============================> payload
    key:whatthehell,------------- >>data
}.
```

12. The adaptive communication method among components based on Linux, as recited in claim 4, wherein the JSON format of the message is:

```
#ctrl: {,=============================> header
    src:gtclient_desktop,-------- >>source
    dst:gtclient_laptop,--------- >>destination
    dataDesc:test,-------------- >>data description
}
#data: {,=============================> payload
    key:whatthehell,------------- >>data
}.
```

13. The adaptive communication method among components based on Linux, as recited in claim 5, wherein the JSON format of the message is:

```
#ctrl: {,=============================> header
    src:gtclient_desktop,------>>source
    dst:gtclient_laptop,--------- >>destination
    dataDesc:test,-------------- >>data description
}
#data: {,=============================> payload
    key:whatthehell,------------- >>data
}
#    <<PacketTail   #.
```

14. The adaptive communication method among components based on Linux, as recited in claim 6, wherein the JSON format of the message is:

```
#ctrl: {,============================> header
    src:gtclient_desktop,------>>source
    dst:gtclient_laptop,--------- >>destination
    dataDesc:test,--------------- >>data description
}
#data: {,============================> payload
    key:whatthehell,------------- >>data
}
#    <<PacketTail    #.
```

15. The adaptive communication method among components based on Linux, as recited in claim 7, wherein the JSON format of the message is:

```
#ctrl: {,============================> header
    src:gtclient_desktop,------>>source
    dst:gtclient_laptop,--------- >>destination
    dataDesc:test,--------------- >>data description
}
#data: {,============================> payload
```

```
    key:whatthehell,------------- >>data
}
#    <<PacketTail    #.
```

16. The adaptive communication method among components based on Linux, as recited in claim 8, wherein the JSON format of the message is:

```
#ctrl: {,============================> header
    src:gtclient_desktop,------>>source
    dst:gtclient_laptop,--------- >>destination
    dataDesc:test,--------------- >>data description
}
#data: {,============================> payload
    key:whatthehell,------------- >>data
}
#    <<Packet Tail    #.
```

* * * * *